Patented Nov. 7, 1933

1,934,017

UNITED STATES PATENT OFFICE 1,934,017

BASIC BISMUTH SALTS OF ORGANIC ARSONIC ACIDS

Karl Streitwolf, Frankfort-on-the-Main, Alfred Fehrle, Bad Soden-on-the-Taunus, and Walter Herrmann, Frankfort-on-the-Main, Germany, assignors to Winthrop Chemical Company, Inc., New York, N. Y., a corporation of New York No Drawing. Application October 25, 1929, Serial No. 402,541, and in Germany November 22, 1928

5 Claims. (Cl. 260—11)

The present invention relates to basic bismuth salts of organic arsonic acids, more particularly to basic bismuth salts of arsonic acids of the benzene series.

In "Comptes Rendus de l'Académie des sciences", volume 180, 1925, page 1971, Levaditi describes a basic alkali-soluble bismuth compound of the 3-acetylamino-4-hydroxy-benzene-arsonic acid. This compound can be prepared by causing the sodium salt of the arsonic acid to react with bismuthyl-potassium-sodium-tartrate.

We have found that new basic bismuth salts of organic arsonic acids of the following probable formula:

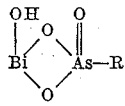

wherein R stands for an aromatic nucleus which may be substituted by one side chain, a heterocyclic nucleus, hydroxy, alkyl, halogen, amino, nitro or further groups, are obtainable by causing the alkaline salts of organic arsonic acids to react with a solution of a bismuth salt other than bismuthyl-potassium-sodium-tartrate. These preparations which in contradistinction to the compound of Levaditi are insoluble in alkali, and which possess the combined therapeutical action of arsenic and bismuth, show antiparasitary properties and are especially suitable for the depot treatment of trypanosoma and spirochatae diseases.

The following examples serve to illustrate our invention, but they are not intended to limit it thereto.

(1) 27.5 grams of 3-acetylamino-4-hydroxy-benzene-1-arsonic acid are dissolved in 100 cc. of 2N caustic soda solution. A solution of 48.5 grams of bismuth nitrate in 48.5 grams of glycerine and 97 grams of water is introduced drop by drop into this solution while vigorously stirring. Then the solution is neutralized by the addition of 50 cc. of 2N caustic soda solution, the precipitated bismuth salt is filtered by suction, washed with water, alcohol and ether and dried in a vacuum. The preparation is a feebly yellow powder. It has the following formula:

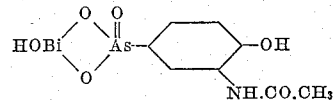

or

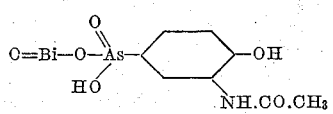

(2) In the same manner as indicated in Example (1), 25.9 grams of para-acetylamino-benzene-arsonic acid can be transformed into their bismuth salt.

(3) 27.2 grams of 3.4-benz-(4-N-methyl)-imidazolon-arsonic acid, prepared according to U. S. Patent No. 1,674,368, dated June 19, 1928, in the name of Wilhelm Kolle, Karl Streitwolf and Alfred Fehrle, are dissolved in 100 cc. of 2N caustic soda solution and the solution is caused to react with bismuth nitrate as indicated in Example (1). The bismuth salt is filtered by suction, washed and dried.

(4) 45 grams of the formaldehydebisulfite compound of 3-amino-4-hydroxybenzene-1-arsonic acid are dissolved in 150 cc. of water. A solution of 48.5 grams of bismuth nitrate which is prepared as indicated in Example (1) is introduced drop by drop while vigorously stirring, the whole is then neutralized by addition of 50 cc. of 2N caustic soda solution and the precipitated salt is isolated as indicated in Example (1).

In the preceding examples the benzene nucleus may also be substituted in the other places by substituents such as alkyl, halogen, amino-, hydroxy- or nitro-groups.

The amino group can likewise be substituted by alkyl and generally by acid radicals.

We claim:

1. The compounds of the following probable formula:

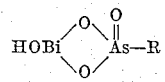

wherein R stands for an aromatic nucleus which may be substituted by a side chain, 4N-methyl-imidazolone, hydroxy, halogen, amino, acylamino or nitro groups, said compounds being insoluble in alkali.

2. The compounds of the following probable formula:

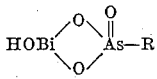

wherein R stands for a benzene nucleus which may be substituted by a side chain, 4N-methylimidazole, hydroxy, halogen, amino, acylamino or nitro groups, said compounds being insoluble in alkali.

3. The compounds of the following probable formula:

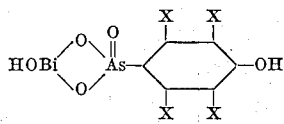

wherein X stands for hydrogen, halogen, amino, acetylamino, a hydroxy or nitro group, said compounds being insoluble in alkali.

4. The compounds of the following probable formula:

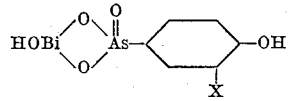

wherein X stands for amino or acetylamino, said compounds being insoluble in alkali.

5. The compound of the following probable formula:

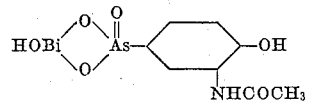

being a feebly yellow colored powder which is insoluble in alkali and water.

KARL STREITWOLF.
ALFRED FEHRLE.
WALTER HERRMANN.